United States Patent
Nishizawa et al.

(10) Patent No.: US 11,629,653 B2
(45) Date of Patent: Apr. 18, 2023

(54) OBSERVATION APPARATUS, OBSERVATION METHOD, AND NON-TRANSITORY COMPUTER READABLE MEDIUM STORING A PROGRAM

(71) Applicant: JAPAN AEROSPACE EXPLORATION AGENCY, Tokyo (JP)

(72) Inventors: Toshio Nishizawa, Tokyo (JP); Junichi Kazawa, Tokyo (JP); Hiroshi Gotoda, Tokyo (JP); Hiroaki Kobayashi, Tokyo (JP); Yuto Hayashi, Tokyo (JP); Takayoshi Hachijo, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 83 days.

(21) Appl. No.: 17/046,943

(22) PCT Filed: Mar. 25, 2019

(86) PCT No.: PCT/JP2019/012401
§ 371 (c)(1),
(2) Date: Oct. 12, 2020

(87) PCT Pub. No.: WO2019/202917
PCT Pub. Date: Oct. 24, 2019

(65) Prior Publication Data
US 2021/0164406 A1 Jun. 3, 2021

(30) Foreign Application Priority Data
Apr. 17, 2018 (JP) .............................. JP2018-079096

(51) Int. Cl.
G06F 17/11 (2006.01)
F02C 9/28 (2006.01)
(Continued)

(52) U.S. Cl.
CPC .................. *F02C 9/28* (2013.01); *F02C 7/32* (2013.01); *F02C 9/16* (2013.01); *G06F 17/11* (2013.01)

(58) Field of Classification Search
CPC ...... F02C 9/28; F02C 7/32; F02C 9/16; F02C 9/00; G06F 17/11; G06F 17/10;
(Continued)

(56) References Cited

U.S. PATENT DOCUMENTS

| | | | |
|---|---|---|---|
| 2003/0007860 | A1 | 1/2003 | Nakajima et al. |
| 2005/0038570 | A1 | 2/2005 | Grauer |

(Continued)

FOREIGN PATENT DOCUMENTS

| | | |
|---|---|---|
| EP | 3 382 208 A1 | 10/2018 |
| JP | 2005-507056 A | 3/2005 |

(Continued)

OTHER PUBLICATIONS

Huo et al. "Multi-scale Recurrence Quantification Analysis of Heartbeat Interval Series in Healthy vs. Heart Failure Subjects", 2014, International Conference on BioMedical Engineering and Informatics, pp. 347-352 (Year: 2014).*

(Continued)

*Primary Examiner* — Mohamed Charioui
(74) *Attorney, Agent, or Firm* — Saliwanchik, Lloyd & Eisenschenk

(57) ABSTRACT

[Object] To observe the sign or occurrence of an unstable operation of a turbo-machine.
[Solving Means] An observation apparatus 1 includes: a detection unit 10 including one or two or more sensors 11, 12 that are disposed in a turbo-machine 2, are highly time responsive, and observe unsteady fluctuations of the turbo-machine 2; a computation unit 20 that output signals from the one or two or more sensors 11, 12 every moment, stores (Continued)

time series data for a predetermined period, and calculates in real time a parameter for detecting an unstable operation of the turbo-machine; and a determination unit 30 that compares the parameter for detecting the unstable operation with a predetermined threshold and outputs in real time a determination result of a sign or occurrence of the unstable operation.

15 Claims, 15 Drawing Sheets

(51) Int. Cl.
*F02C 7/32* (2006.01)
*F02C 9/16* (2006.01)

(58) Field of Classification Search
CPC ........ G06F 17/00; F01D 21/003; F01D 21/14; F01D 25/04; F01D 27/001; F01D 29/668; F01D 25/00; F23R 3/28; F23R 2900/00013; F23R 3/00; F05D 2260/80; F05D 2270/09; F05D 2270/334; F05D 2270/808

See application file for complete search history.

(56) References Cited

U.S. PATENT DOCUMENTS

| | | | |
|---|---|---|---|
| 2009/0312930 | A1 | 12/2009 | Nakakita et al. |
| 2016/0025596 | A1* | 1/2016 | Heda ................. G01M 15/14 73/112.06 |
| 2017/0284410 | A1* | 10/2017 | Sharpe, Jr. ............. G05D 7/06 |
| 2018/0283391 | A1* | 10/2018 | Abrol ................. F04D 27/0246 |
| 2018/0328817 | A1* | 11/2018 | Andrews ................. F02C 9/28 |
| 2019/0032510 | A1 | 1/2019 | Abrol et al. |

FOREIGN PATENT DOCUMENTS

| | | |
|---|---|---|
| JP | 2007-309250 A | 11/2007 |
| JP | 2008-14679 A | 1/2008 |
| JP | 2013-238365 A | 11/2013 |
| JP | 2016-173211 A | 9/2016 |
| JP | 2018-80621 A | 5/2018 |
| JP | 2018-197543 A | 12/2018 |
| WO | WO-2017/142707 A1 | 8/2017 |

OTHER PUBLICATIONS

Supplementary European Search Report dated Dec. 1, 2021 in European Application No. 19788439.8.
Office Action dated Jan. 14, 2022 in Japanese Application No. 2018-079096.
Office Action dated Nov. 16, 2021 in Canadian Application No. 3,097,323.
International Search Report in International Application No. PCT/JP2019/012401, filed Mar. 25, 2019.
Hachijo, T. et al., "Detection of Cascade Flutter in Low Pressure Turbine using a Support Vector Machine," *The 49th JSASS Annual Meeting*, 2018, pp. 1-3, with English abstract.
Nikimoto, H. et al., "Nonlinear time series analysis on pressure fluctuations in a lean premixed gas turbine combustor," *47th Symposium (Japanese) on Combustion*, 2009, pp. 1-3, with partial English translation.
Kobayashi, M. et al., "Early detection of thermoacoustic combustion oscillations in a laboratoryscale premixed gas-turbine combustor using dynamical system theory.," *The Japan Society of Mechanical Engineers*, 2013, pp. 1-2, with partial English translation.
Gotoda, H., "Nonlinear Properties of Combustion Instability Based on Dynamical Systems Theory," *Journal of the Combustion Society of Japan*, 2015, 57(181):183-190.
Tachibana, S., "Studies on Combustion Instabilities in Gas Turbine Engine Combustors," *Journal of the Combustion Society of Japan*, 2015, 57(181):33-40.
Hagino, N. et al., "Prediction and Active Control of Surge Inception of a Centrifugal Compressor," *Proceeding of the International Gas Turbine Congress*, 2003, pp. 1-6, GTSJ.
Gu, C. et al., "Observation of Centrifugal Compressor Stall and Surge in Phase Portraits of Pressure Time Trace at Impeller and Diffuser Wall," *Journal of Fluids Engineering*, Jun. 2007, 129:773-779, ASME.
D'Ischia, M. et al., "Perspectives of Phase-Portraits in the Detection of Compressor Instabilities—Inception of Stall.," *Active Control Technology for Enhanced Performance Operational Capabilities of Military Aircraft, Land Vehicles and Sea Vehicles*, May 8-11, 2000, pp. 1-13.
Office Action dated Aug. 10, 2022 in Canadian Application No. 3,097,323.

* cited by examiner q = 6kg/s q = 8.5kg/s q = 9.5kg/s

OBSERVATION APPARATUS, OBSERVATION METHOD, AND NON-TRANSITORY COMPUTER READABLE MEDIUM STORING A PROGRAM

CROSS-REFERENCE TO RELATED APPLICATIONS

This application is the U.S. national stage application of International Patent Application No. PCT/JP2019/012401, filed Mar. 25, 2019, which claims the benefit under 35 U.S.C. § 119 of Japanese Application No. 2018-079096, filed Apr. 17, 2018, the disclosures of each of which are incorporated herein by reference in their entirety.

TECHNICAL FIELD

The present invention relates to an observation apparatus, an observation method, and a non-transitory computer readable medium storing a program that can be applied to various technical fields of gas turbine engines for aircraft, watercraft, or automobiles, gas turbines for power generation, steam turbines, and the like.

BACKGROUND ART

Turbo-machines (fans, compressors, turbines) that constitute engines for aircraft and gas turbines function to compress or expand a working fluid (working air). Typically, a configuration in which a number of blades are disposed on a circumference with rotating blades and stationary blades alternately combined is employed, and compression or expansion can be achieved by allowing the working fluid to pass through an annular flow channel between those blades.

It is long known that aerodynamic unstable operations (surge, stall) and unstable operations (flutter) due to fluid structure coupling occur in a turbo-machine. When such an unstable operation occurs, it may lead to a serious accident such as large vibrations of the engine centered on the turbo-machine and damage of parts including the rotating blades and even engine fire due to backflow from a combustor (also during flight of aircraft).

Such an unstable operation often occurs suddenly during the operation of the turbo-machine, and the operator must recognize it only after it occurs and take measures such as an emergency stop of the engine (also during flight of aircraft).

In general, during the operation of the turbo-machine, the above-mentioned risk is avoided by a method of performing the operation only under stable operation conditions on a design operation line set such that unstable operations are unlikely to occur and performing control to avoid the occurrence of the unstable operations.

In the design stage, a method of enhancing the safety is employed by setting the blade thickness, the blade width, and the like to be larger than those of the optimum shape or by making a safe design in which the compression performance and the expansion performance are slightly lower in order to avoid damage caused by unstable operations.

In order to satisfy requirements for higher output and higher efficiency of aircraft engines and gas turbines, it is becoming necessary to employ a longer (larger diameter) and thinner (lower resistance) blade shape for blades of turbo-machines (fans, compressors, turbines), and the restrictions are becoming severe only by the above-mentioned safety design and operation control.

In recent years, basic research has been conducted to enable prediction in the design stage by application of basic experiments and numerical analysis on when and under what conditions unstable operations of turbo-machines will occur. However, exact occurrence conditions have not been elucidated.

For example, basic research is underway on a method for observing and controlling the occurrence of unstable operations (blow-off and the like) of a combustor in real time by drawing an attractor in a phase space on the basis of time series data obtained during the operation and calculating its translation error.

Basic research to attempt observation and control with similar parameters has also been conducted on unstable operations of a centrifugal compressor (see Patent Literature 1 to 8).

Moreover, Patent Document 1 has disclosed a technology for controlling a combustion state by detecting pressure fluctuations in a combustion chamber of a gas turbine model combustor through a pressure transducer and outputting it as a pressure fluctuation signal, converting the waveform of the output pressure fluctuation signal into a trace in a phase space, calculating a translation error on the basis of the trace, estimating the occurrence of blow-off by comparing the translation error with a threshold, setting a target value of a secondary fuel flow rate, and controlling the secondary fuel flow rate to become closer to the set target value.

Patent Literature 2 has disclosed an observation apparatus including a detection unit that detects a physical quantity of a physical phenomenon that changes over time, a generation unit that sets the detected physical quantity at each time as a node and generates a complex network in which a plurality of nodes are connected with edges according to a certain condition over time, a calculation unit that determines a predetermined feature amount (average order) in the complex network, and an estimation unit that estimates a state of the physical phenomenon on the basis of the feature amount.

However, it is difficult to determine the occurrence of the unstable operations of the turbo-machine in accordance with the method using the translation error or the average order as a detection parameter.

CITATION LIST

Patent Literature

Patent Literature 1: Japanese Patent Application Laid-open No. 2013-238365
Patent Literature 2: Japanese Patent Application Laid-open No. 2016-173211

Non-Patent Literature

Non-Patent Literature 1: Proceedings of the 49th JSASS Annual Meeting, The Japan Society for Aeronautical and Space Sciences, scheduled to be published on 19Apr. 2018, "Detection of Cascade Flutter in Low Pressure Turbine using a Support Vector Machine", Takayoshi HACHIJO, Hiroaki KOBAYASHI, Yuto HAYASHI, Hiroshi GOTODA, Toshio NISHIZAWA, Junichi KAZAWA.
Non-Patent Literature 2: Proceedings of the 47th Symposium (Japanese) on Combustion, The Combustion Institute, 2009.12.2, Nonlinear time series analysis on pressure fluctuations in a lean premixed gas turbine combustor, Hiroyuki NIKIMOTO, Hiroshi GOTODA, Takaya MIYANO, Shigeru TACHIBANA.

Non-Patent Literature 3: Proceedings of Conference of Kansai Branch, No. 1120, The Japan Society of Mechanical Engineers, 2013.3, Early detection of thermoacoustic combustion oscillations in a laboratory-scale premixed gas-turbine model combustor using dynamical system theory, Masaki KOBAYASHI, Ryo UKITA, Yuta SHINODA, Yuta OKUNO, Hiroshi GOTODA, Shigeru TACHIBANA.

Non-Patent Literature 4: Journal of the Combustion Society of Japan, Vol. 57 No. 181, The Combustion Institute, 2015.8, Nonlinear Properties of Combustion Instability Based on Dynamical Systems Theory, Hiroshi GOTODA.

Non-Patent Literature 5: Journal of the Combustion Society of Japan, Vol. 57 No. 181, The Combustion Institute, 2015.8, Studies on Combustion Instabilities in Gas Turbine Engine Combustors, Shigeru TACHIBANA.

Non-Patent Literature 6: Proceedings of the International Gas Turbine Congress 2003 Tokyo, TS-038, Gas Turbine Society of Japan, 2003.11.2, Prediction and Active Control of Surge Inception of a Centrifugal Compressor, Naoto HAGINO, Kazufumi UDA and Yasushige KASHIWABARA.

Non-Patent Literature 7: Journal of Fluid Engineering, Transaction of the ASME, Vol. 9, The American Society of Mechanical Engineers, 2007.6, Observation of Centrifugal Compressor Stall and Surge in Phase Portraits of Pressure Time Traces at Impeller and Diffuser Wall, Chunwei GU, Kazuo YAMAGUCHI, Toshio NAGASHIMA, Hirotaka HIGASHIMORI.

Non-Patent Literature 8: RTO AVT Symposium on "Active Control Technology for Enhanced Performance Operational Capabilities of Military Aircraft, Land Vehicles and Sea Vehicles (RTO MP-051), 2000.5.8, PERSPECTIVES of PI IASE-PORTRAITS in the DETECTION of COMPRESSOR INSTABILITIES-INCEPTION of STALL, M. D'ISCHIA, F.A.E. BREUGELMANS.

DISCLOSURE OF INVENTION

Technical Problem

In view of the above-mentioned circumstances, it is an object of the present invention to provide an observation apparatus, an observation method, and a non-transitory computer readable medium storing a program, by which the sign or occurrence of an unstable operation of a turbo-machine can be observed.

It is another object of the present invention to provide an observation apparatus, an observation method, and a non-transitory computer readable medium storing a program, by which an unstable operation of a turbo-machine can be observed on the basis of physical quantities measured by a lowest number of sensors.

It is still another object of the present invention to provide an observation apparatus, an observation method, and a non-transitory computer readable medium storing a program, which can be applied to the existing aircraft engines and the existing gas turbines for power generation.

Solution to Problem

In order to accomplish the above-mentioned object, an observation apparatus according to an embodiment of the present invention includes: a detection unit including one or two or more sensors that are disposed in a turbo-machine, are highly time responsive, and observe unsteady fluctuations of the turbo-machine; a computation unit that output signals from the one or two or more sensors every moment, stores time series data for a predetermined period, and calculates in real time a parameter for detecting an unstable operation of the turbo-machine; and a determination unit that compares the parameter for detecting the unstable operation with a predetermined threshold and outputs in real time a determination result of a sign or occurrence of the unstable operation.

In the present invention, it is possible to compute in real time the parameter for detecting the unstable operation, typically, a detection parameter applying an observation method based on the complex systems science with respect to the time series data obtained from the output signals from the one or two or more sensors that are disposed in the turbo-machine, are highly time responsive, and observe unsteady fluctuations of the turbo-machine and to determine a sign indicating that the unstable operation (flutter, surge, stall) will occur or a change immediately after the unstable operation (flutter, surge, stall) occurs. That is, the present invention focuses on the fact that fluctuations and vibrations occurring when unstable operations (flutter, surge, stall) occur in the turbo-machine are phenomena having unique periodicity, and early determines the process of occurrence by quantitatively evaluating randomness and a recurrence change on the basis of the time series data. The observation apparatus according to the present invention favorably further includes a control unit that outputs, when the determination unit outputs the determination result of the sign or occurrence of the unstable operation, a signal for changing an operation condition for an operation control apparatus of the turbo-machine and/or a signal for warning of an operation of the turbo-machine.

Here, as a method of calculating the above-mentioned detection parameter, it is effective to use a method of calculating the detection parameter by using an index of a sample entropy, a sample entropy considering a multi-scale property, recurrence plots, or a permutation entropy The one or two or more sensors may be disposed on at least one of a rotating unit, a stationary unit, an inside of a flow channel, or a wall surface in contact with the flow channel in the turbo-machine.

In the observation apparatus according to the present invention, the detection unit, the computation unit, and the determination unit may include two or more detection units, two or more computation units, and two or more determination units or the detection unit, the computation unit, and the determination unit may include two or more types of detection units, two or more types of computation units, and two or more types of determination units.

An observation method according to an embodiment of the present invention includes: disposing one or two or more sensors that are highly time responsive to a turbo-machine and observe unsteady fluctuations of the turbo-machine; inputting output signals from the one or two or more sensors every moment, storing time series data for a predetermined period, and calculating in real time a parameter for detecting an unstable operation of the turbo-machine; and comparing the parameter for detecting the unstable operation with a predetermined threshold and outputting in real time a determination result of a sign or occurrence of the unstable operation.

According to an embodiment of the present invention, there is provided a non-transitory computer readable medium storing a program that causes a computer to execute:

a step of inputting output signals from one or two or more sensors every moment one or two or more sensors that are disposed in a turbo-machine, are highly time responsive, and observe unsteady fluctuations of the turbo-machine, storing time series data for a predetermined period, and calculating in real time a parameter for detecting an unstable operation of the turbo-machine; and a step of comparing the parameter for detecting the unstable operation with a predetermined threshold and outputting in real time a determination result of a sign or occurrence of the unstable operation.

Here, flutter, which is one of the unstable operations, is a phenomenon in which while the blade vibrations remain at a minute amplitude or immediately damp in normal operation, the amplitude rapidly increases by coupling of the natural frequency of the blade itself and the external force received from the fluid, resulting in damage when the strength limit of the blade is exceeded. In case of the occurrence of flutter, it is characterized in that blades (rotating blades, stationary blades) arranged in an annular shape in the turbo-machine vibrate at their natural frequencies and have a substantially constant phase difference (including 0 degrees) from the adjacent blades and are amplified while the phase of the blade vibrations is transmitted in the circumferential direction. The occurrence of flutter can be inhibited if structural damping or the like due to blade mounting parts or the like can be sufficiently increased. Although a limit cycle in which the amplification stops at a constant amplitude is reached in some cases, the safety problem is not solved because there is a danger of fatigue fracture of the blades due to vibrations for a long time. Flutter is likely to occur near the stable operation limit on a lower flow rate side (higher load side) in the compressor and is likely to occur near the stable operation limit on a higher flow rate side (lower load side) in the turbine.

Stall is a state in which the working fluid passing between the rotating blades and the stationary blades cannot be normally compressed or expanded. Typically, the flow of the boundary layer along the blade surface is separated, resulting in a large energy loss, which inhibits compression and expansion as designed. It is a phenomenon of an aerodynamic unstable operation not necessarily accompanied by blade vibrations. Stall is more likely to occur during the compression process of the compressor and is more likely to occur near the stable operation limit on the lower flow rate side (higher load side). The state of the flow around the blade is not the same (or not in the above-mentioned phase) for all the blades in the circumferential direction and its characteristics fluctuate periodically with a phase difference between it and the adjacent blade. It is characterized in that the phase of the fluctuations of the flow is transmitted in the circumferential direction and is transmitted in the direction of rotation of the rotating blades at a speed lower than the rotation speed. The fluctuations amplitude of the flow increases in the initial stage of the occurrence of stall, but it usually reaches a limit cycle when it reaches a certain amplitude.

Surge is characterized in that the entire flow field passing through the turbo-machine begins to fluctuate greatly in the axial direction, leading to large fluctuations in the flow rate itself of the turbo-machine. Moreover, it is also characterized in that its fluctuation frequency is lower (slower) in comparison with the frequency of flutter or stall. It has been reported that in case of the occurrence of surge, flutter of the blades or stall of the flow also occurs at the same time or before it, but the flutter or stall does not always occur with surge and it is not clarified under what conditions the flutter or stall will occur with surge.

When the unstable operation phenomenon occurs in the turbo-machine, it is accompanied by large blade vibrations or flow fluctuations, but the fluctuations have certain periodicity in either case and there is a characteristic that in flutter and stall, the phase returns to the original state after a certain time while the phase propagates in the circumferential direction. Blade vibrations and flow fluctuations in normal operation have very small amplitude, those are random fluctuations, and certain periodicity or recurrence is not observed. Therefore, it is possible to immediately determine the sign or occurrence of the unstable operation by computing an index clearly indicating whether the time series data obtained from the high-response fluctuation sensor is random or regular.

Advantageous Effects of Invention

According to the present invention, since a sign indicating that an unstable operation will occur or a change after the unstable operation occurs can be determined in real time by observing sensor signals, it is possible to avoid the unstable operation immediately after detecting the sign or to safely stop the operation before reaching a serious situation after detecting the occurrence.

Even in a case where an unexpected unstable operation the occurrence condition of which is not known beforehand occurs, it can be detected. The safety and reliability of aircraft engines and gas turbines are thus improved.

Since it is unnecessary to make a safety design in which the thickness and width of the blade shape is increased more than necessary, it is possible to further enhance the outputs and efficiency of aircraft engines and gas turbines, and it has a great effect on fuel cost reduction.

Since the number of necessary sensor signals is minimized, it is easy to add them to the existing aircraft engines and the existing gas turbines for power generation. Therefore, the present invention can be widely usable not only in new products but also in the existing products.

Since the number of necessary sensor signals is minimized, a redundant system can be structured only by increasing them. It is thus easy to enhance the reliability of the observation apparatus.

MODE(S) FOR CARRYING OUT THE INVENTION

Hereinafter, an embodiment of the present invention will be described with reference to the drawings.

<Configuration of Observation Apparatus>

Figure 1:
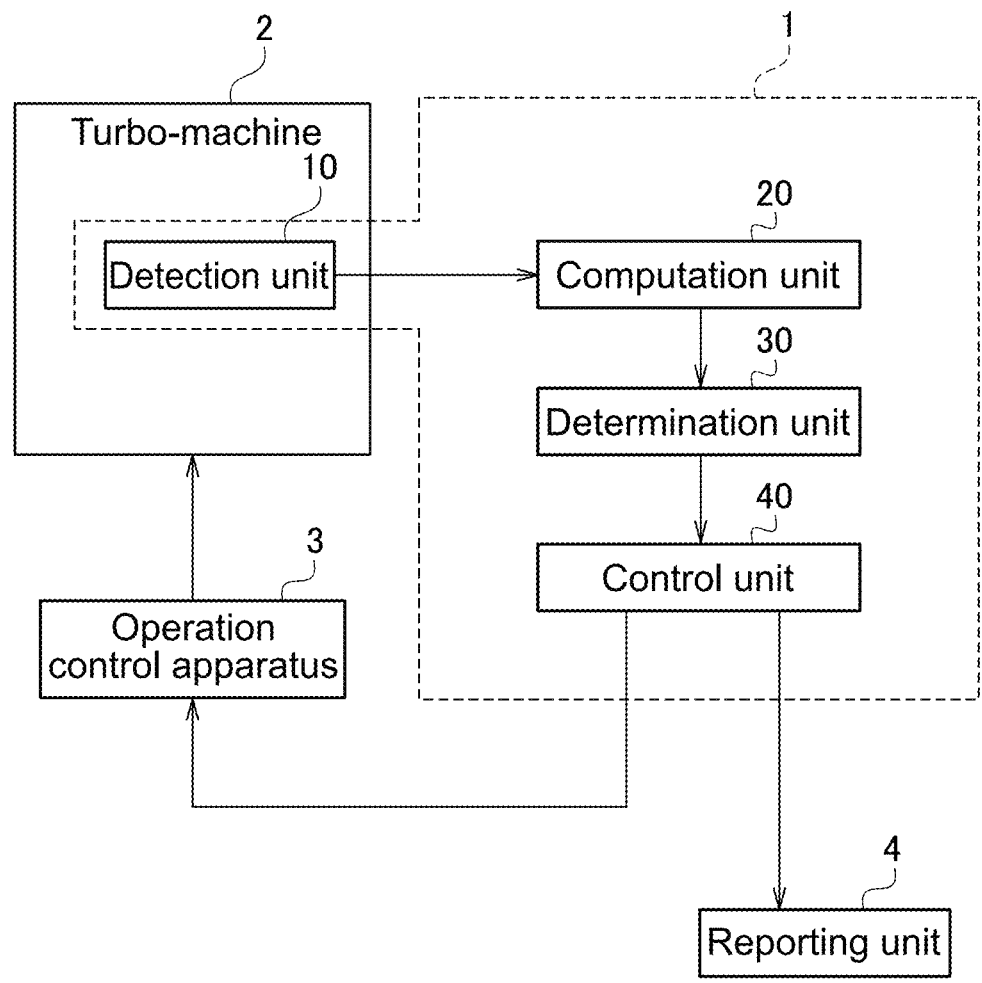
FIG. 1 A block diagram showing an observation apparatus according to an embodiment of the present invention.

FIG. 1 is a block diagram showing an observation apparatus according to the embodiment of the present invention.

As shown in FIG. 1, an observation apparatus 1 includes a detection unit 10, a computation unit 20, a determination unit 30, and a control unit 40.

The detection unit 10 includes one or two or more sensors that are disposed in a turbo-machine 2, are highly time responsive, and observe unsteady fluctuations of the turbo-machine 2.

Figure 2:
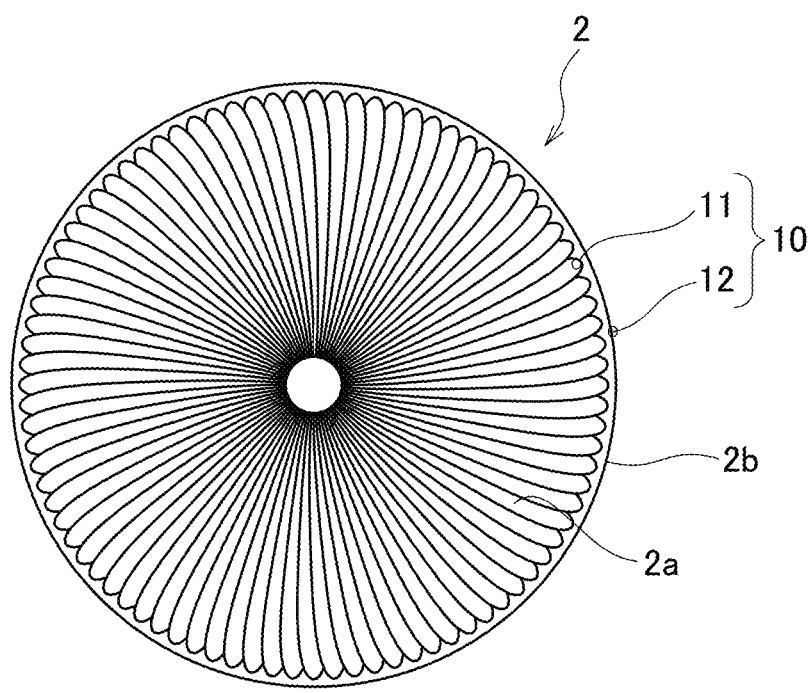
FIG. 2 A schematic diagram showing an example in which sensors according to the embodiment of the present invention are disposed in a turbo-machine.

As shown in FIG. 2, the detection unit 10 includes a sensor 11 attached to a blade 2a which is the rotating unit of the turbo-machine 2, a sensor 12 attached to a wall surface 2b which is the stationary unit facing a leading end of the blade 2a, and the like. Such a sensor that is the detection unit 10 may be disposed in a flow channel or on a wall surface in contact with the flow channel.

The sensor 11 is constituted of, for example, a strain gauge that detects strain of the blade in real time and the sensor 12 is constituted of, for example, an unsteady pressure sensor that detects the pressure of the fluid in real time. In this embodiment, these sensors 11 and 12 are for observing flutter, which is one of the unstable operations. The sensor 12 may be disposed in a flow channel or on a wall surface in contact with the flow channel, for example. In order to observe stall and surge, which are unstable operations, it is sufficient to dispose sensors in a similar manner.

The calculation unit 20 inputs output signals from the sensor 11 and the sensor 12 every moment, stores time series data for a predetermined period, and quantitatively evaluates randomness and a recurrence change on the basis of the time series data, to thereby calculate a parameter for detecting an unstable operation of the turbo-machine 2 in real time. For example, the computation unit 20 inputs an output signal from the sensor 11 every moment, stores time series data for a predetermined period, and calculates a parameter for detecting flutter in real time.

The determination unit 30 compares the parameter for detecting the unstable operation with a predetermined threshold and outputs a determination result of the sign or occurrence of the unstable operation in real time.

When the determination unit 30 outputs the determination result of the sign or occurrence of the unstable operation, the control unit 40 outputs a signal for changing the operation condition to an operation control apparatus 3 of the turbo-machine 2. Moreover, when the determination unit 30 outputs the determination result of the sign or occurrence of the unstable operation, the control unit 40 outputs a signal for warning a reporting unit 4 of an operation of the turbo-machine 2.

When the operation control apparatus 3 receives the signal for changing the operation condition, the operation control apparatus 3 controls the turbo-machine 2 to stop the operation of the turbo-machine 2, for example.

When the reporting unit 4 receives the signal associated with the warning, the reporting unit 4 supplies an alarm signal for a pilot or operator to perform manual control for an aircraft, for example.

Here, as a method of calculating the detection parameter in the computation unit 20, it is effective to use a method of calculating the detection parameter by using an index of a sample entropy, a sample entropy considering a multi-scale property, recurrence plots, or a permutation entropy. Hereinafter, the method of calculating the detection parameter by using these indices will be described.

(Sample Entropy)

The sample entropy refers to an index for quantitatively evaluating the randomness of the time series data. Specifically, time series data $\{x(t_i)\}$, i=1, 2, ..., N is embedded in phase spaces of D and D+1 dimensions, and the conditional probability that a point that was nearby in the D dimension is also nearby in the D+1 dimension is defined as a negative natural logarithm.

A sample entropy SE is as follows.

$$S_E = -\log \frac{\sum_{i=1, i \neq j}^{N-D} \Theta(r - d[X_{D+1}(i), X_{D+1}(j)])}{\sum_{i=1, i \neq j}^{N-D+1} \Theta(r - d[X_D(i), X_D(j)])}$$

Here, the following equations are established.

Figure 3:
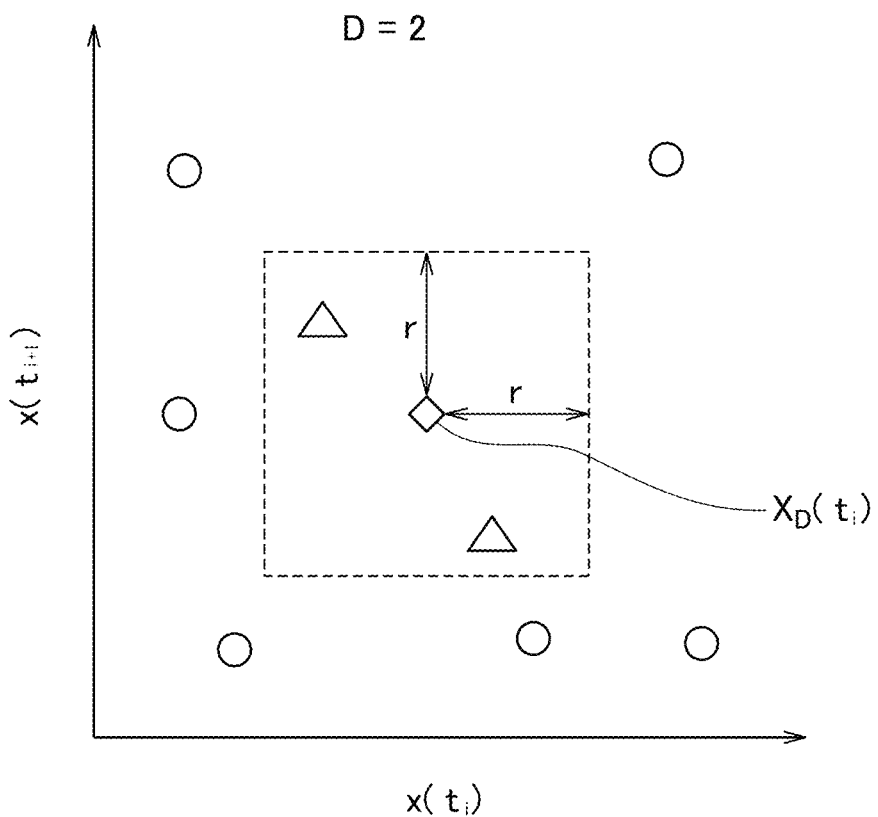
FIG. 3 A graph showing an arrangement example of time series data for describing a sample entropy.

$d[X_D(t_i), X_D(t_j)] = \max |x(t_{i+k}) - x(t_{j+k})|$ $X_D(t_i) = (x(t_i), x(t_{i+1}), x(t_{i+2}), \ldots, x(t_{i+D-1}))$ Then, for example, as shown in FIG. 3, $\Theta(\cdot)=1$ in a case where $X_D(t_j)$ exists in the D-dimensional cube centered on $X_D(t_i)$ and $\Theta(\cdot)=0$ in a case where $X_D(t_j)$ does not exist in the D-dimensional cube centered on $X_D(t_i)$.

Figure 4:
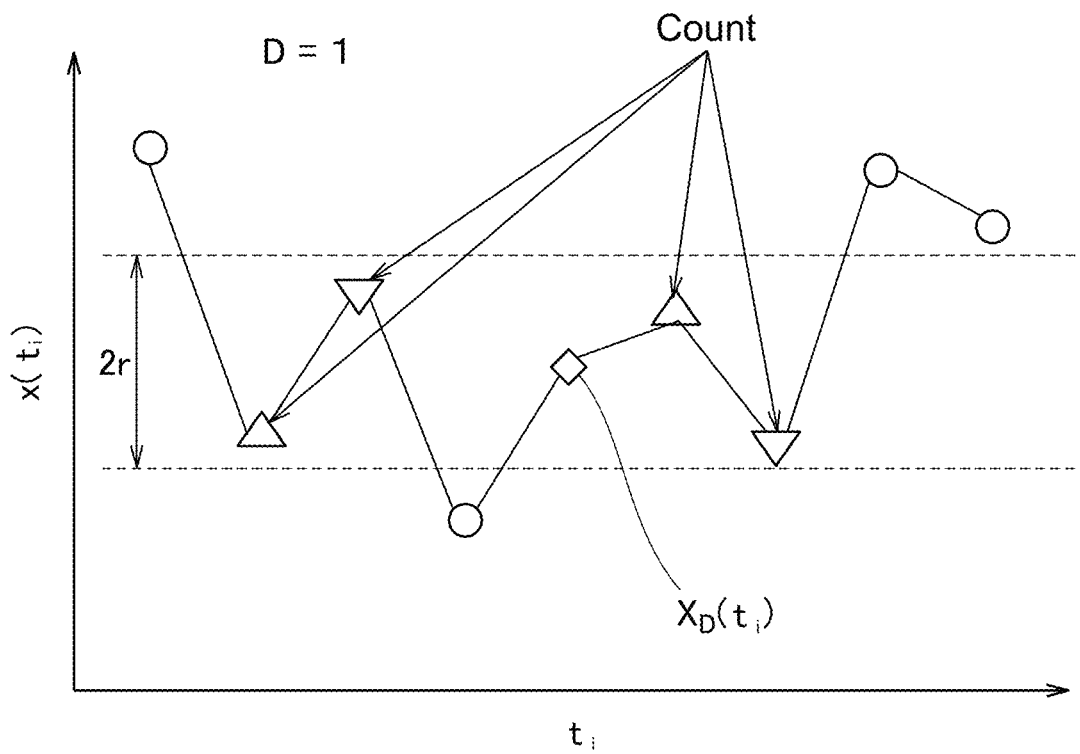
FIG. 4 A graph showing an example of the arrangement of the time series data in a case where D=1 in the sample entropy.

Here, for example, as shown in FIG. 4, provided that D=1 and the point ◇ is used as a reference, two points Δ and two points ∇ are counted.

Figure 5:
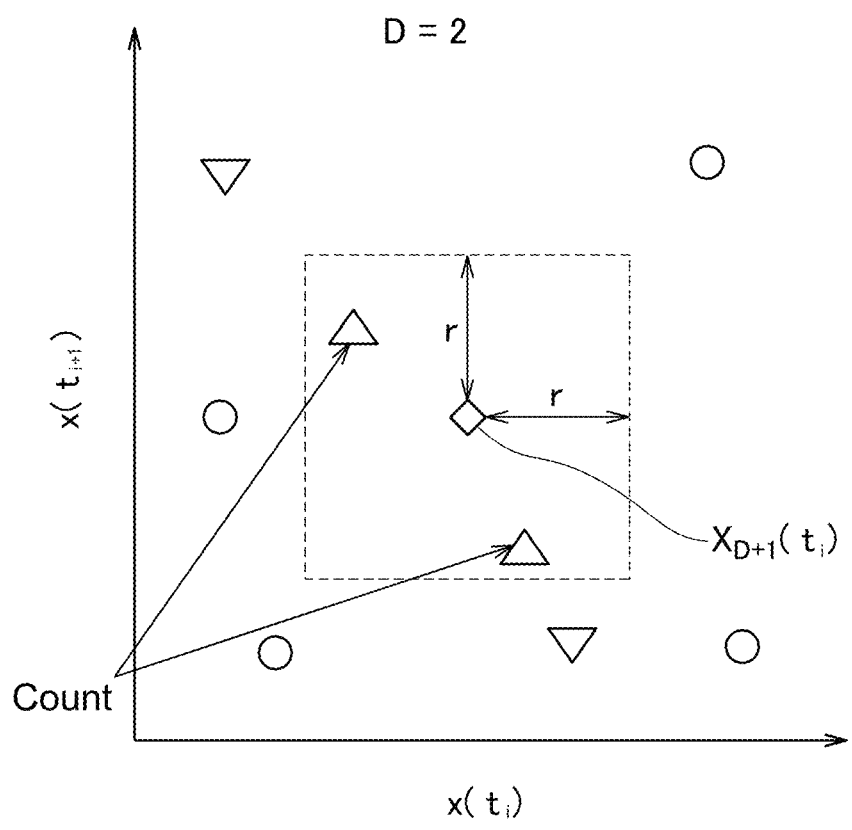
FIG. 5 A graph showing an example of the arrangement of the time series data in a case where D=2 in the sample entropy.

As shown in FIG. 5, provided that D=2 and the point ◇ is used as a reference, only two points △ are counted. The points ∇ are not counted in a case where D=2 because the points ∇ are moved outside the D-dimensional cube by extending the dimensionality.

A similar procedure is performed at all discrete points of the time series data and the sample entropy $S_E$ is calculated.

In this embodiment, settings are performed such that a threshold r is 0.15 times as large as the standard deviation and D=2. By setting the threshold as appropriate, it is possible to capture the sign and occurrence of the unstable operation phenomenon of the turbo-machine 2.

(Sample Entropy Considering Multi-Scale Property)

Figure 6:
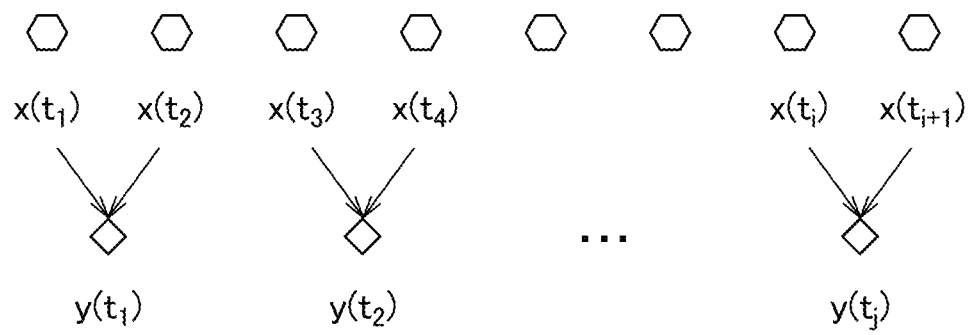
FIG. 6 An explanatory diagram of a method of obtaining time series data obtained by coarse graining considering a multi-scale property.
Figure 6:
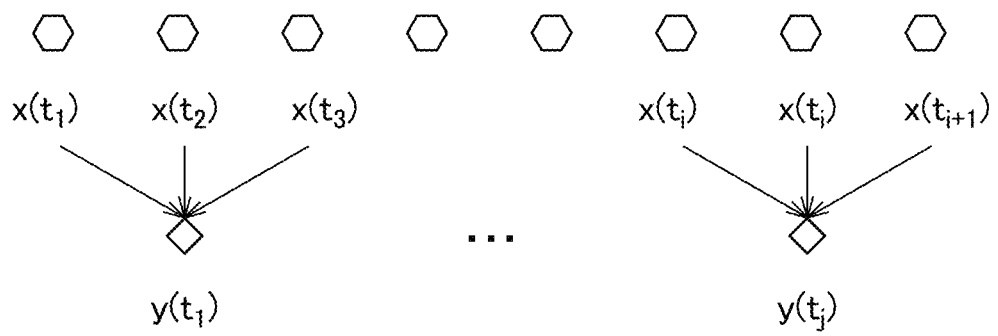

The sample entropy considering the multi-scale property refers to an index for performing coarse graining on the time series data and using the sample entropy. Specifically, the time average of the time series data $x(t_i)$ is determined by non-overlapping average as follows and new time series data $y(t_j)$ as shown in FIG. 6 is obtained.

$$y(t_j) = \frac{1}{s_f} \sum_{i=(j-1)s_f+1}^{js_f} x(t_i)$$

$x(t_i)$: Time series
$s_f$: Scaling factor
$y(t_j)$: Coarse-grained time series Then, the sample entropy $S_E$ is calculated by substituting this new time series data into the defined equation above.

With the sample entropy considering the multi-scale property, it is possible to know influences of different time scales by coarse graining.

In this embodiment, computation was performed by using circumferential strain fluctuations 6 of the blade 2a detected from the sensor 11 as x. The example is shown in FIG. 7.

Figure 7:
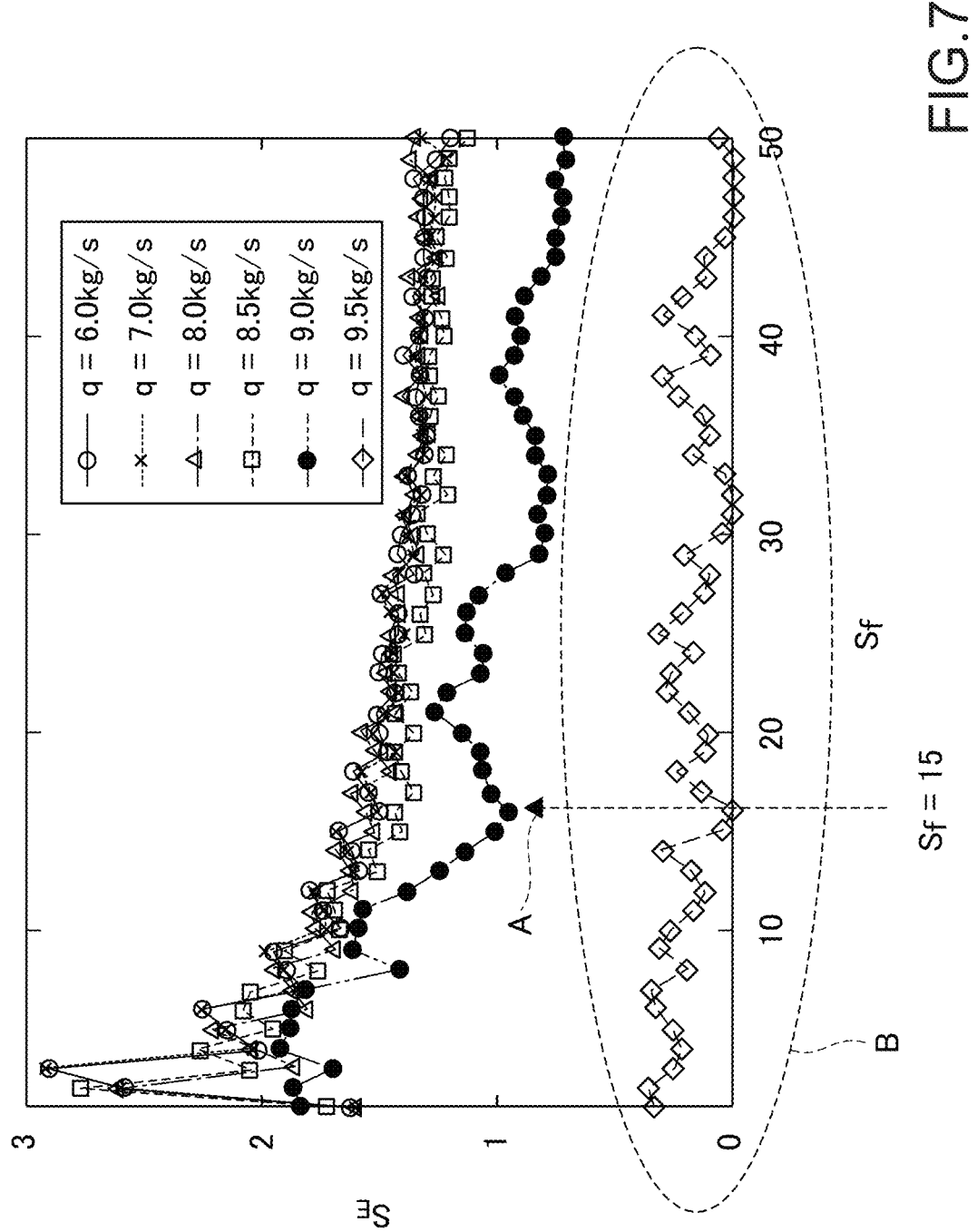
FIG. 7 A graph showing a result of computation using strain fluctuations of blades of the turbo-machine in a sample entropy considering the multi-scale property.

As shown in A of FIG. 7, $S_E$ decreases in the low frequency region after $S_f$=15 at the flow rate q=9.0 kg/s. $S_f$ (=15)×(second-order natural frequency) substantially coincides with the sampling frequency and captures the frequency characteristics of the second-order natural frequency. Therefore, it is possible to capture the sign of flutter by detecting it.

Moreover, $S_E$ is low in the entire region at q=9.5 kg/s. Therefore, it is possible to capture the sign of flutter by detecting it.

(Recurrence Plots)

Figure 8:
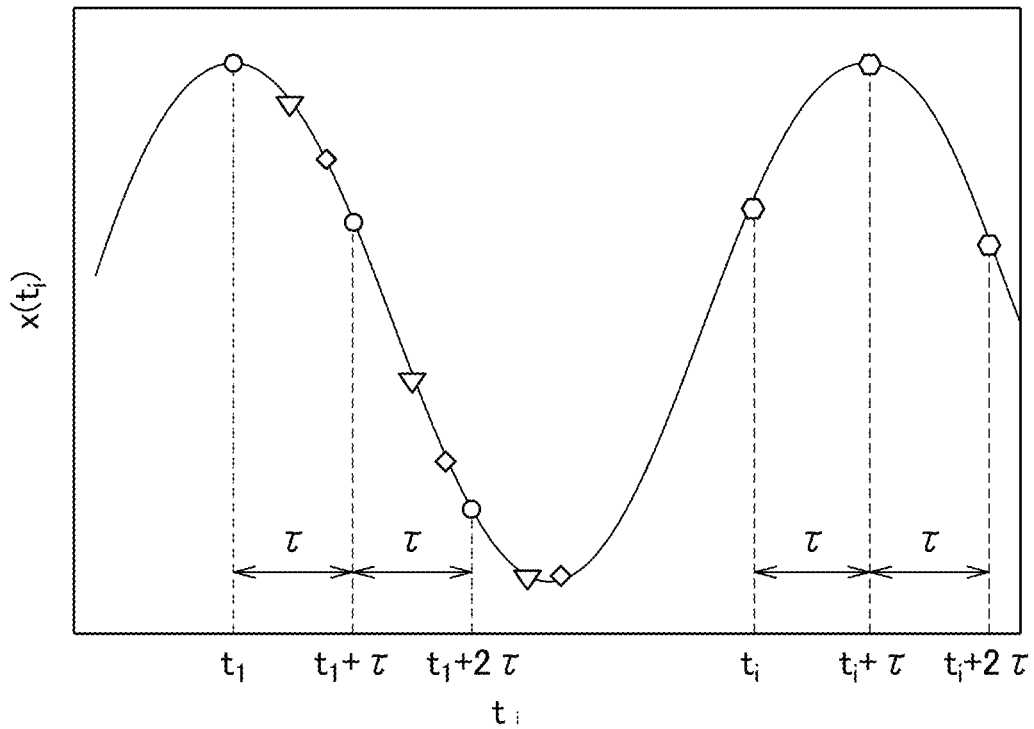
FIG. 8 A graph showing an example of time series data of pressure fluctuations for describing recurrence plots.
Figure 9:
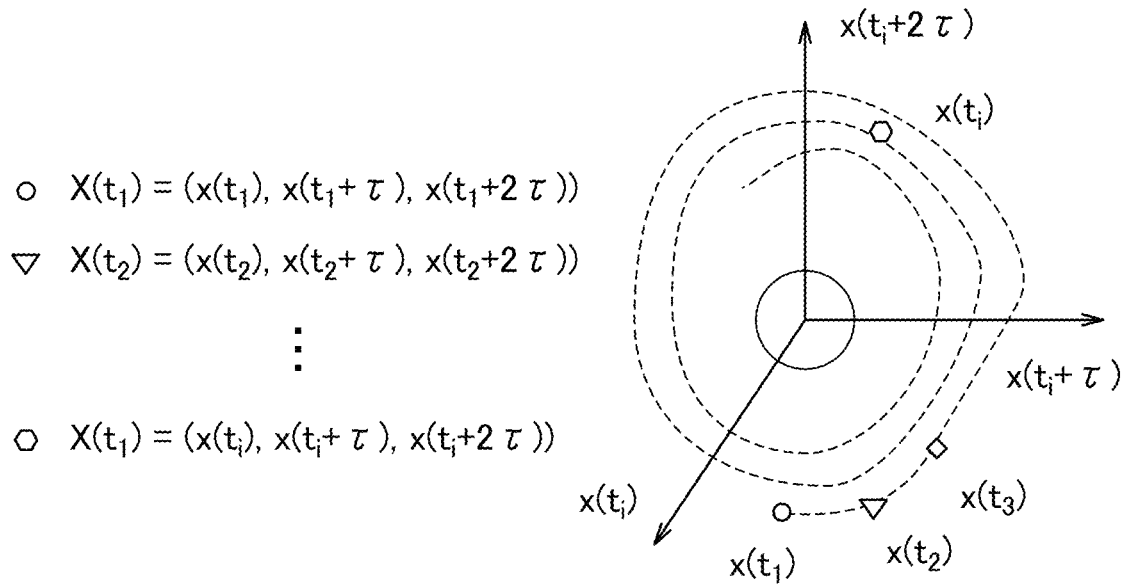
FIG. 9 A graph showing an example in which the time series data shown in FIG. 8 is embedded in a phase space.
Figure 10:
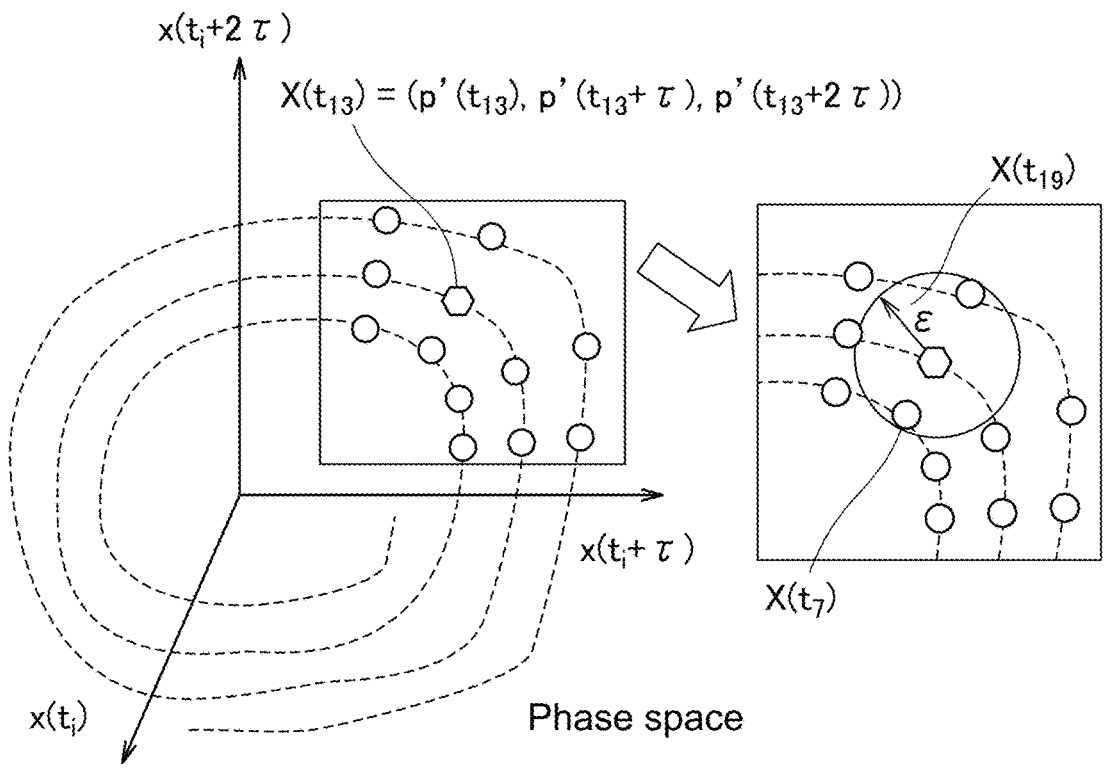
FIG. 10 A graph showing respective points in the phase space.
Figure 11:
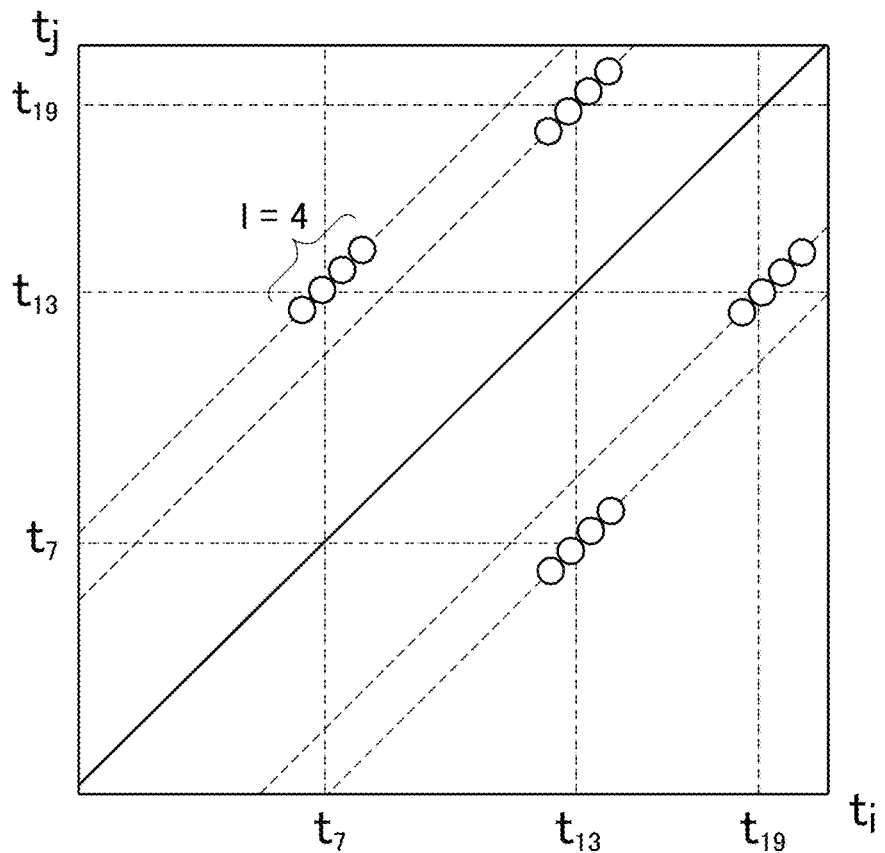
FIG. 11 A graph representing a correlation between the respective points in the phase space shown in FIG. 10 as recurrence plots.
Figure 12:
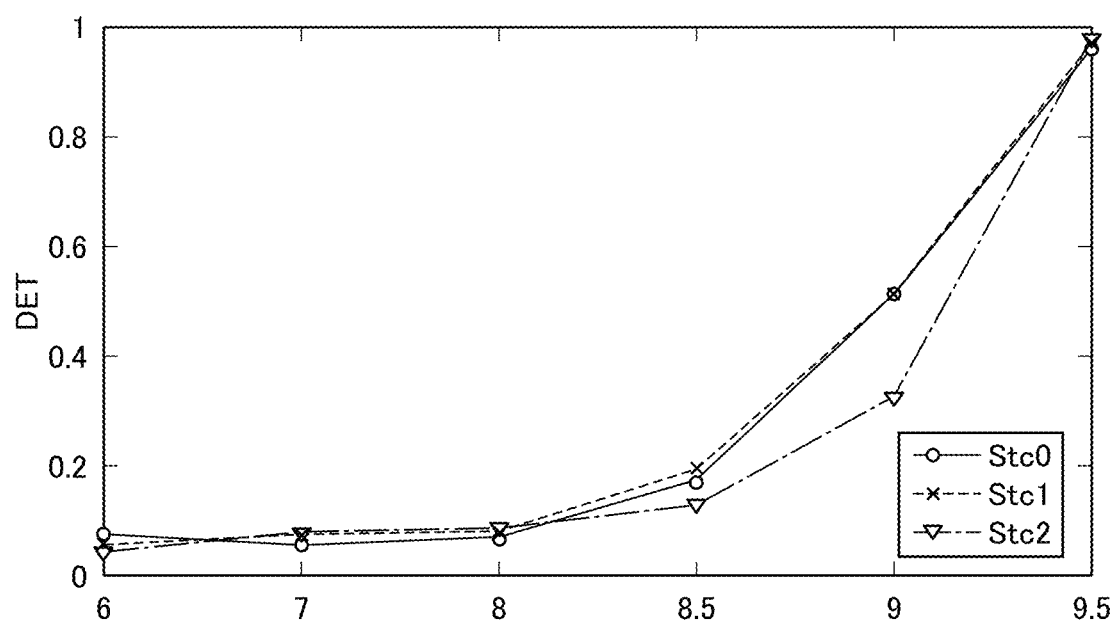
FIG. 12 A graph showing a relationship between each flow rate and DET of the recurrence plots in this embodiment.

The recurrence plots refer to an index for visualizing the correlation between the respective points in the phase space. For example, first of all, the time series of pressure fluctuations shown in FIG. 8 is embedded in the phase space as shown in FIG. 9. Next, the correlation between the respective points in the phase space shown in FIG. 10 is plotted as shown in FIG. 11 by performing computation according to the following equation.

Here, $X(t_i)=(x(t_i),x(t_i+\tau), \ldots ,x(t_i+(D-1)\tau))$ $R_{ij}=\Theta(\varepsilon-\|x(t_i)-x(t_j)\|)$ $i,j=1,2,3,\ldots,N_P$ In the recurrence plots, an index DET representing determinism is calculated in accordance with the following equation.

$$DET = \frac{\sum_{l=l_{min}}^{N_p} lP(l)}{\sum_{l=1}^{N_p} lP(l)}$$

In the equation above,
$\Theta$: Heaviside function
$\varepsilon$: threshold of distance between position vectors
$N_P$: total number of data points in phase space
D: dimension of phase space (D=5 in this embodiment)
$\tau$: delay time (determined based on mutual information amount in this embodiment)
l: length of diagonal line
$l_{min}$: minimum length defined as diagonal line
P(l): frequency distribution function of diagonal line having length l.

The recurrence plots relationship at each flow rate is shown in FIGS. 12 to 15.

Figure 13:
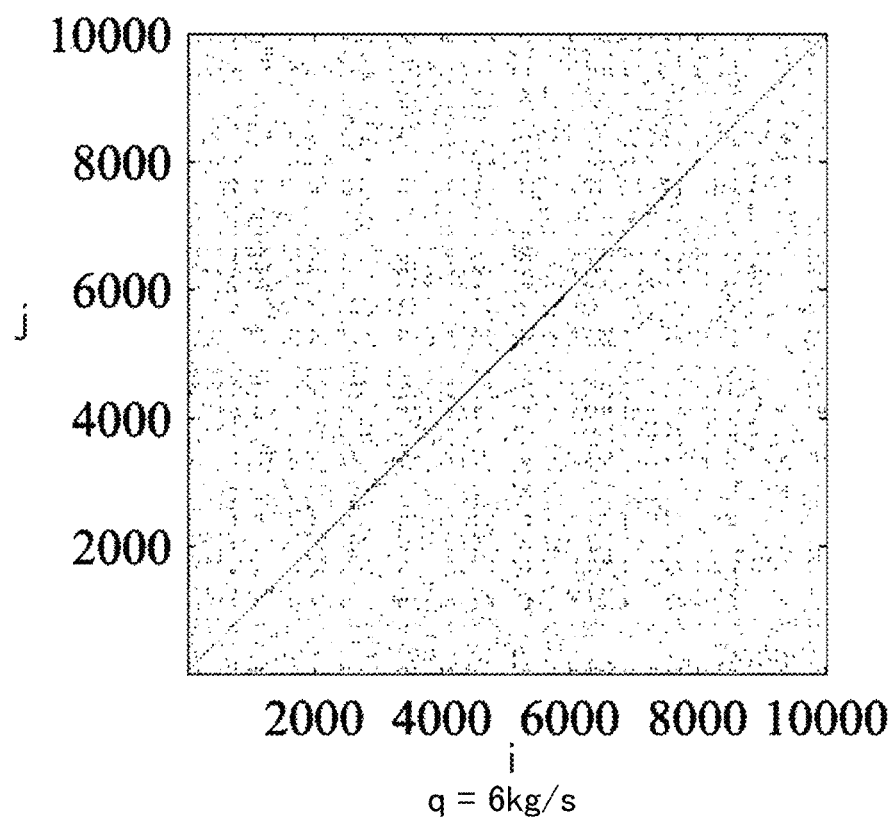
FIG. 13 A relationship diagram of recurrence plots at a flow rate q=6 kg/s.
Figure 14:
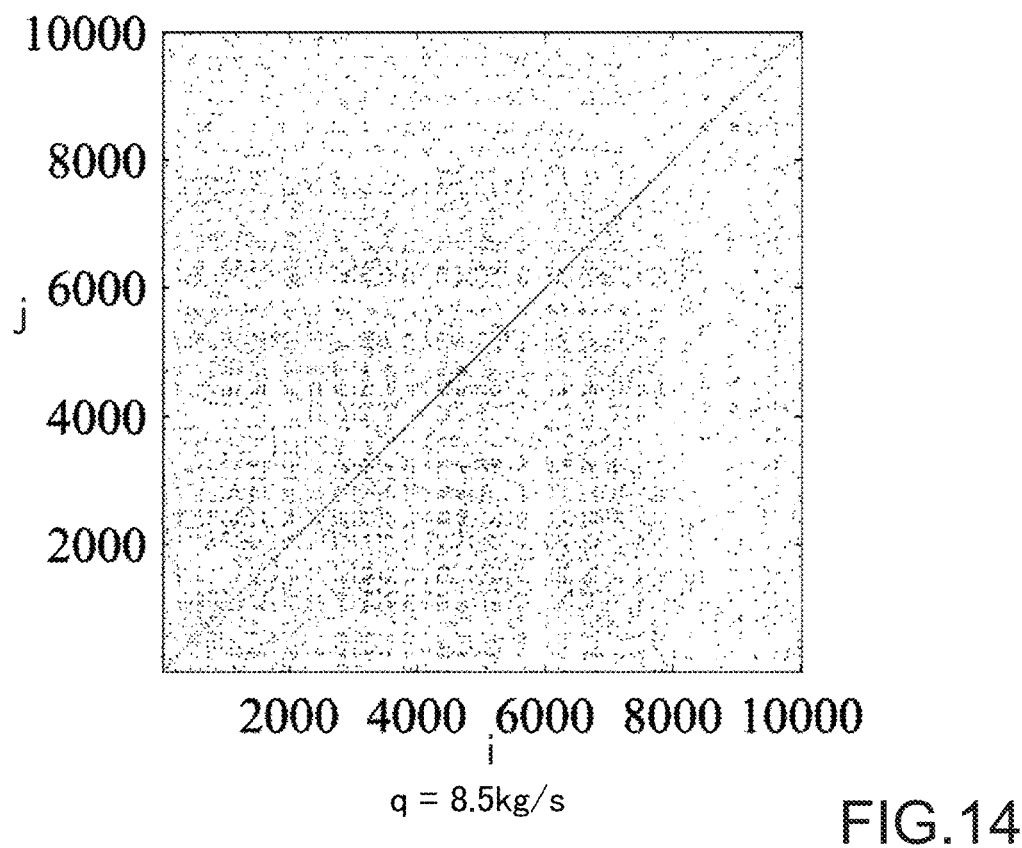
FIG. 14 A relationship diagram of recurrence plots at a flow rate q=8.5 kg/s.
Figure 15:
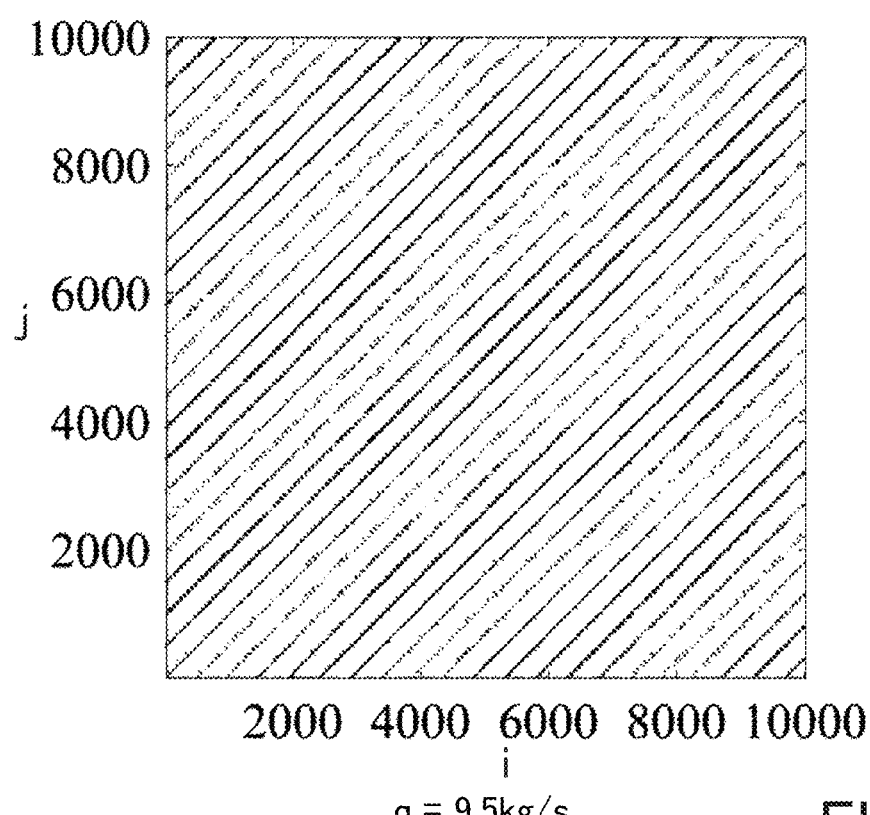
FIG. 15 A relationship diagram of recurrence plots at a flow rate q=9.5 kg/s.

Comparing FIG. 13 with FIG. 14, it can be seen that the recurrence points are increased in the case where q=8.5 kg/s shown in FIG. 14 as compared with the case where q=6 kg/s shown in FIG. 13. Moreover, in the case where q=9.5 kg/s shown in FIG. 15, strong periodicity is observed with the occurrence of flutter. Thus, it can be understood that it is possible to capture the sign and occurrence of flutter by using the recurrence plots.

Figure 16:
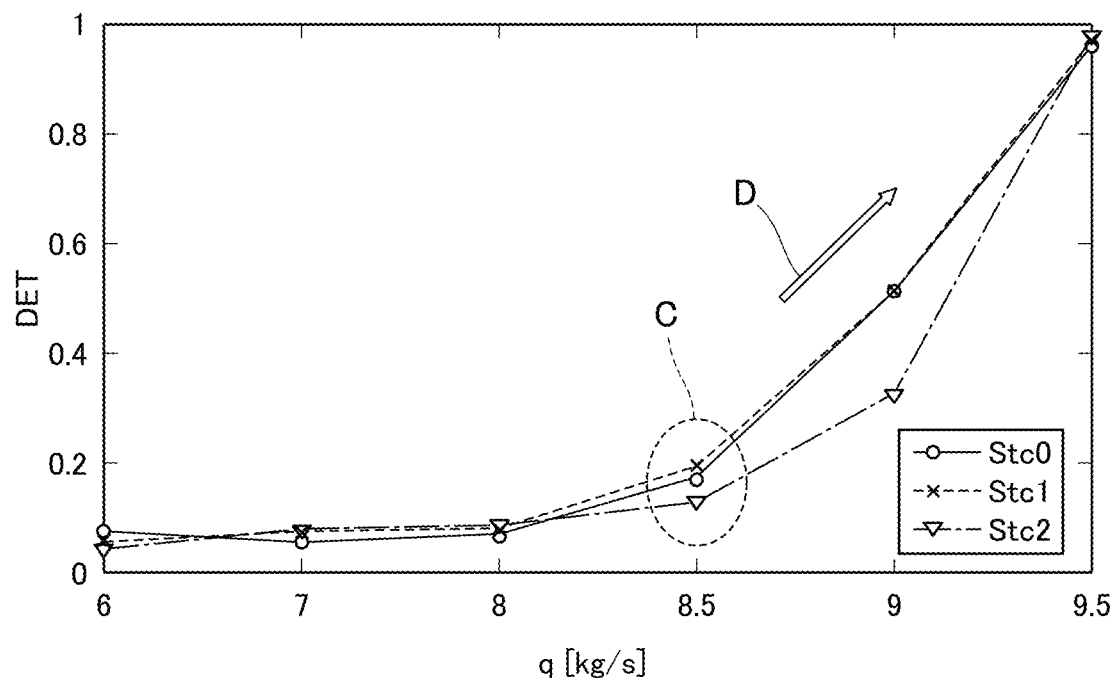
FIG. 16 An explanatory diagram for capturing flutter on the basis of a relationship between each flow rate and the DET of the recurrence plots in this embodiment.

In FIG. 16, results of Stc0, Stc1, and Stc2 in which flutter is developed are analyzed. Stc0, Stc1, and Stc2 are channel names of a strain gauge that detects the strain of the blade 2a in real time.

As shown in C of FIG. 16, the above-mentioned index DET increases at q=8.5 kg/s before the occurrence of flutter. It is possible to detect the sign of flutter by detecting such a slight increase in DET. Moreover, as q increases thereafter, the periodicity of the waveform increases, such that the DET also increases (D of FIG. 16). By detecting it, it is possible to capture the occurrence of flutter.

(Permutation Entropy)

Figure 17:
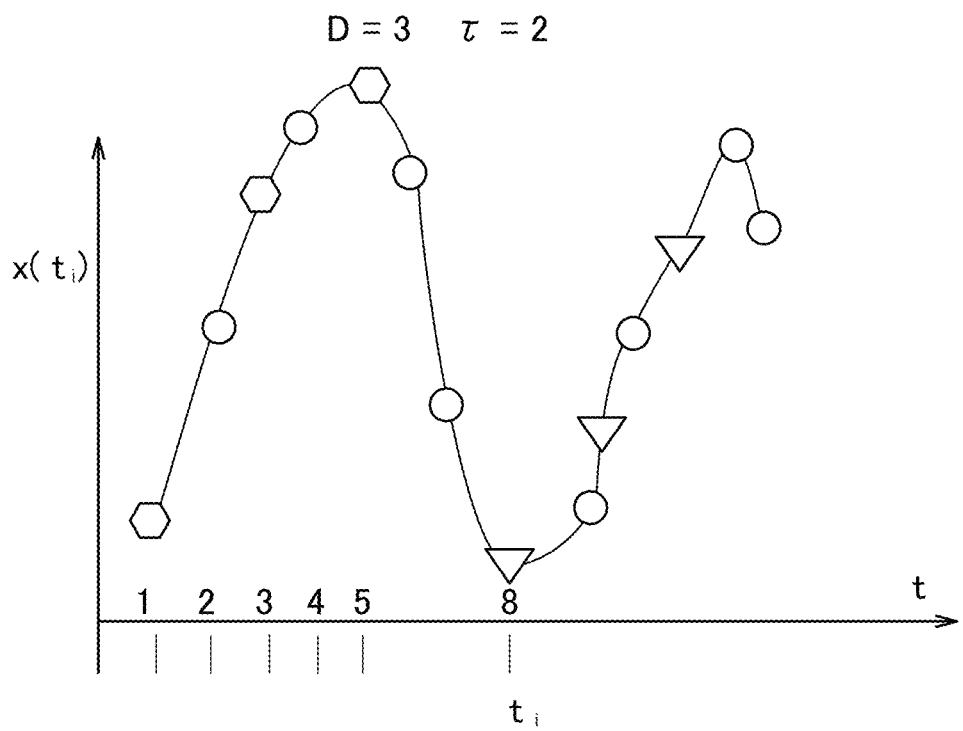
FIG. 17 A graph showing an example of the time series data for describing a permutation entropy.
Figure 18:
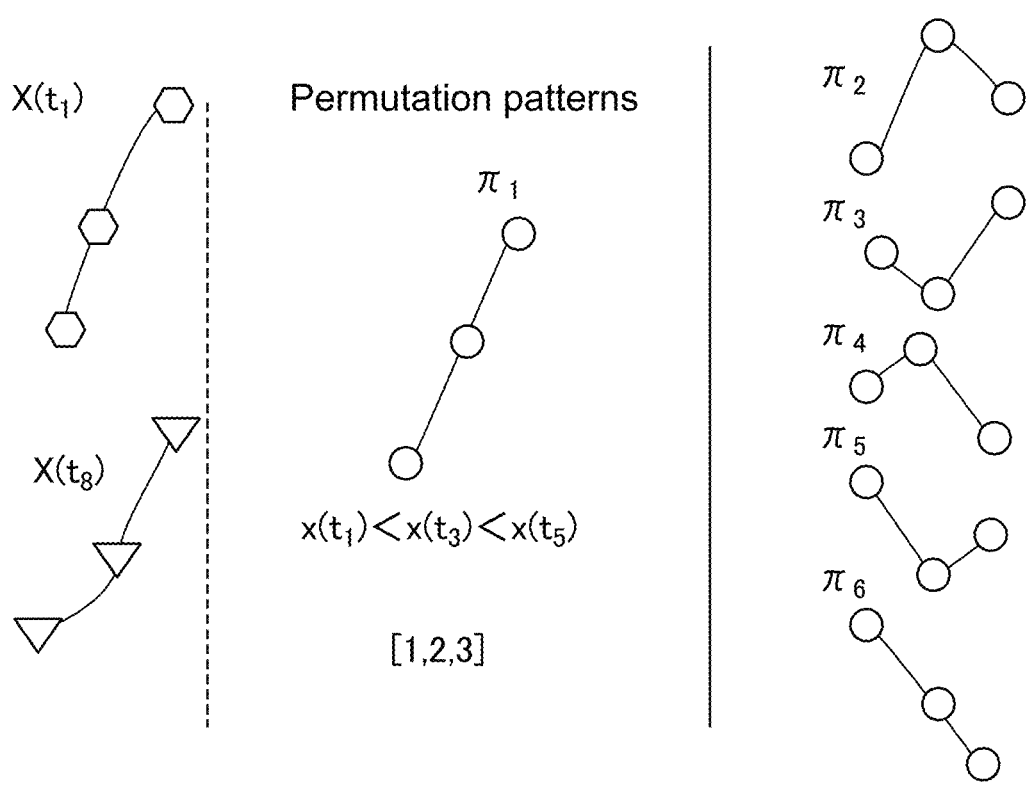
FIG. 18 A diagram classifying the time series data shown in FIG. 17 into permutation patterns.
Figure 19:
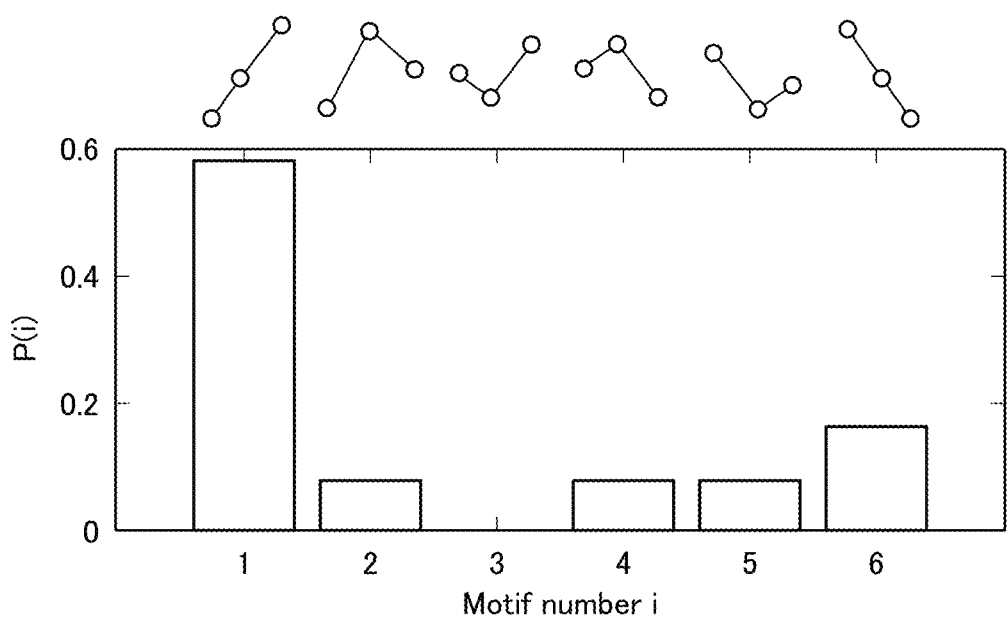
FIG. 19 A graph showing existence probability of the permutation patterns shown in FIG. 18.

The permutation entropy refers to an index for quantitatively evaluating the randomness of the time series data. The time series data shown in FIG. 17 is classified into predetermined permutation patterns as shown in FIG. 18 and existence probability p of each of permutation patterns is obtained as shown in FIG. 19. The permutation entropy is calculated by applying p to the Shannon's information entropy. In general, the Shannon's information entropy is expressed by the following equation using a discrete probability distribution p of the random variable of the event. At this time, N=D!.

$$s = -\sum_{i=1}^{N} p\log_2 p$$

Where the permutation entropy is normalized by maximal entropy (=$\log_2 D!$). In other words, a permutation entropy $h_p$ is determined by calculation as follows.

$$0 \leq h_p = \frac{-\sum_{i=1}^{D!} p(i)\log_2 p(i)}{\log_2 D!} \leq 1$$

Here, a permutation entropy hp means more random as it is closer to 1 and means more periodic as it is closer to 0.

Figure 20:
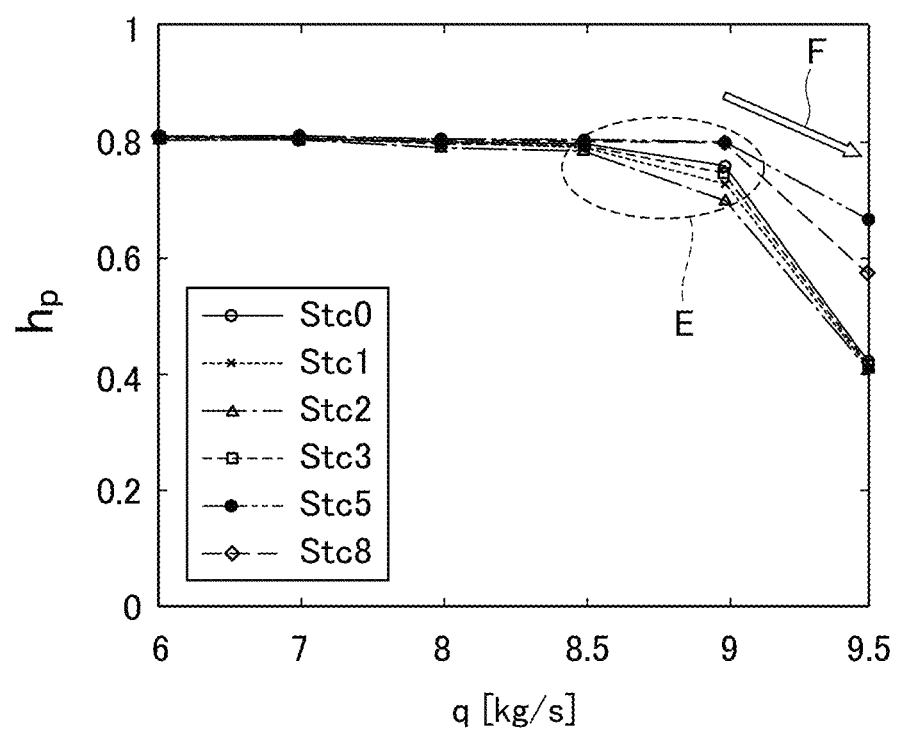
FIG. 20 An explanatory diagram for capturing flutter on the basis of the permutation entropy.

Processed results at Stc0 to Stc8 are shown in FIG. 20. Stc0 to Stc8 are respectively the channel names of the strain gauges that detect the strains of the blade 2a in real time. From E and F in FIG. 20, the permutation entropy decreases because the periodicity of the waveform increases as q increases. It can be seen that the occurrence of flutter can be captured by detecting it.

Figure 21:
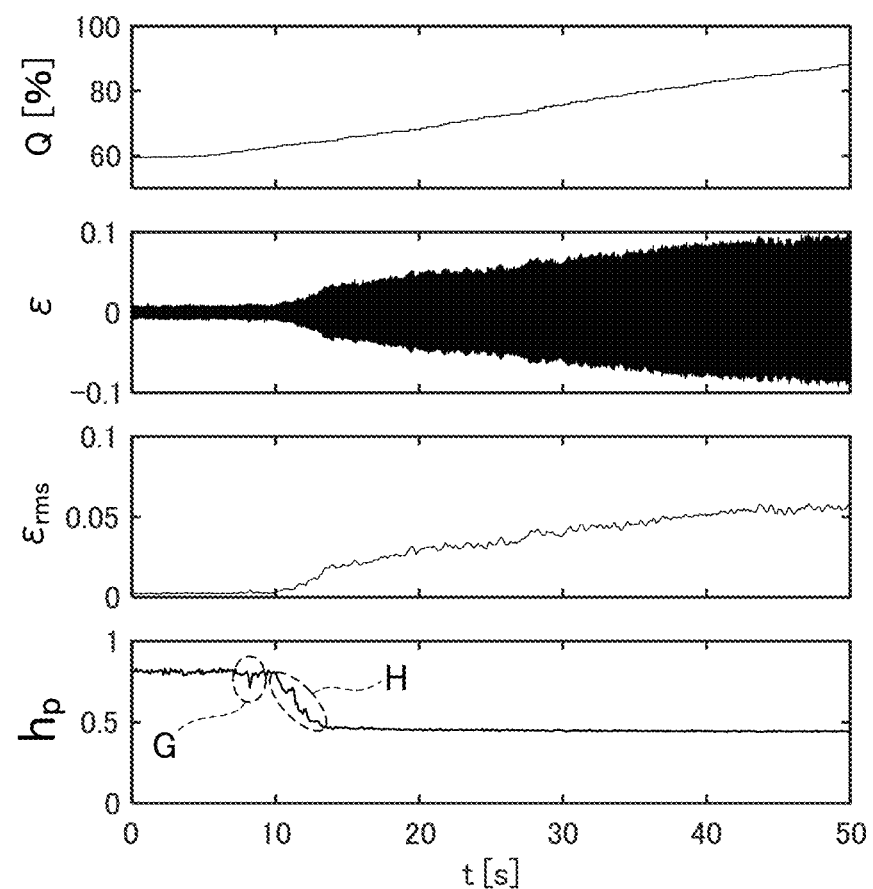
FIG. 21 A graph showing an example of a change over time of the permutation entropy.

FIG. 21 shows a change over time in the permutation entropy.

In FIG. 21,

Q: change in air flow rate over time

ε: change in strain fluctuations over time $\varepsilon_{rms}$: change in root mean square of strain fluctuations over time.

It can be seen from G of FIG. 21 that the permutation entropy $h_p$ decreases to ≈0.85 to 0.7 at t≈8.2 s before the $\varepsilon_{rms}$ increases rapidly. It can be seen from H of FIG. 21 that the permutation entropy $h_p$ decreases to ≈0.85 to 0.45 at t≈10 s when $\varepsilon_{rms}$ increases rapidly.

Therefore, it is understood that although it is difficult to capture the sign and occurrence of flutter in $\varepsilon_{rms}$, it is possible to capture the sign and occurrence of flutter by detecting a change in permutation entropy.

<Others>

The present invention is not limited to the above-mentioned embodiments and can be implemented as various modifications and applications without departing from the technical concept of the invention. The scope of such implementation is also encompassed in the technical scope of the present invention.

Figure 22:
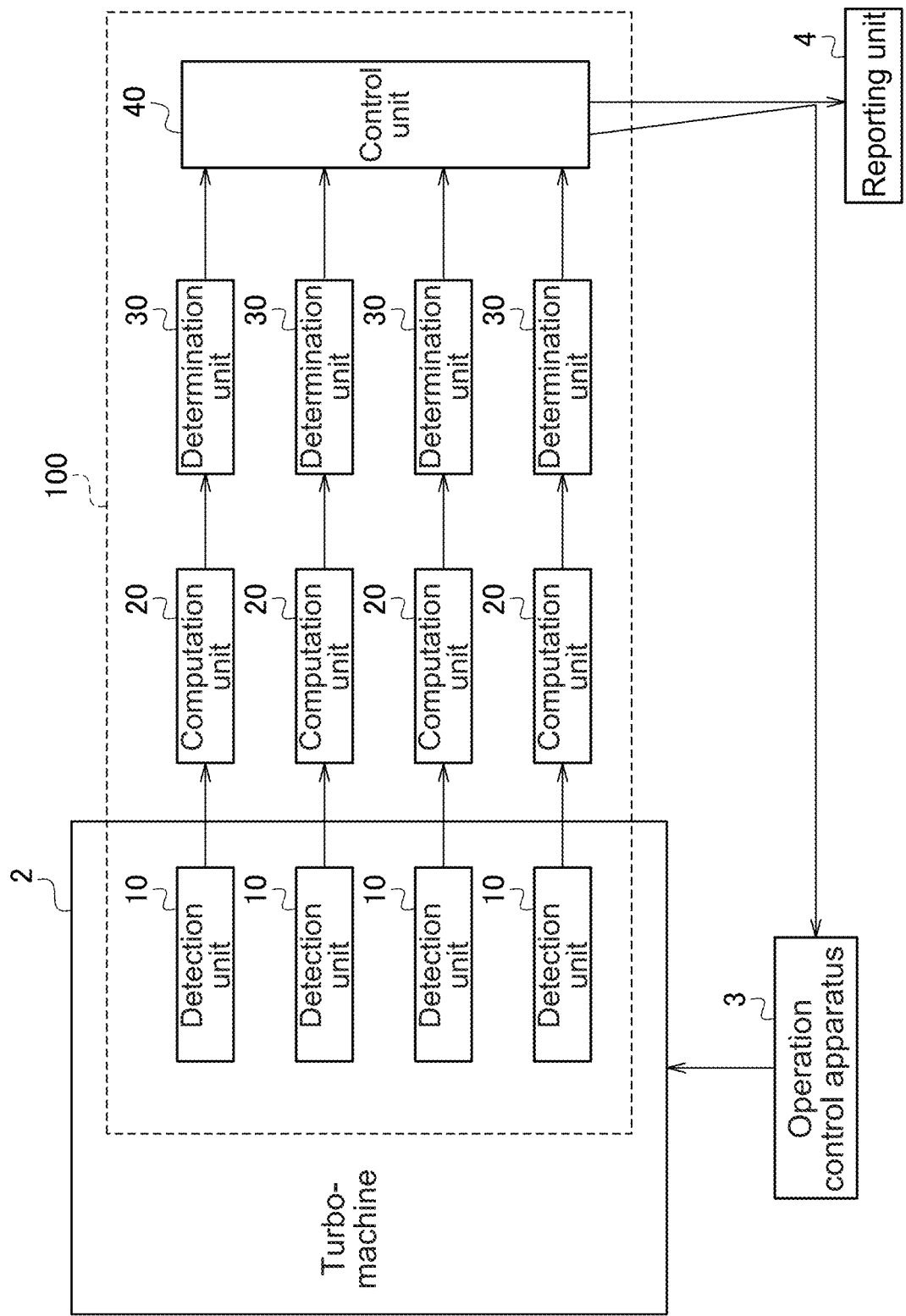
FIG. 22 A block diagram showing an observation apparatus according to another embodiment of the present invention.

For example, as shown in FIG. 22, an observation apparatus 100 may include two or more detection units 10, two or more computation units 20, and two or more determination units 30. By changing the system for observation of the unstable operation into a redundant system in this manner, the reliability can be enhanced.

Figure 23:
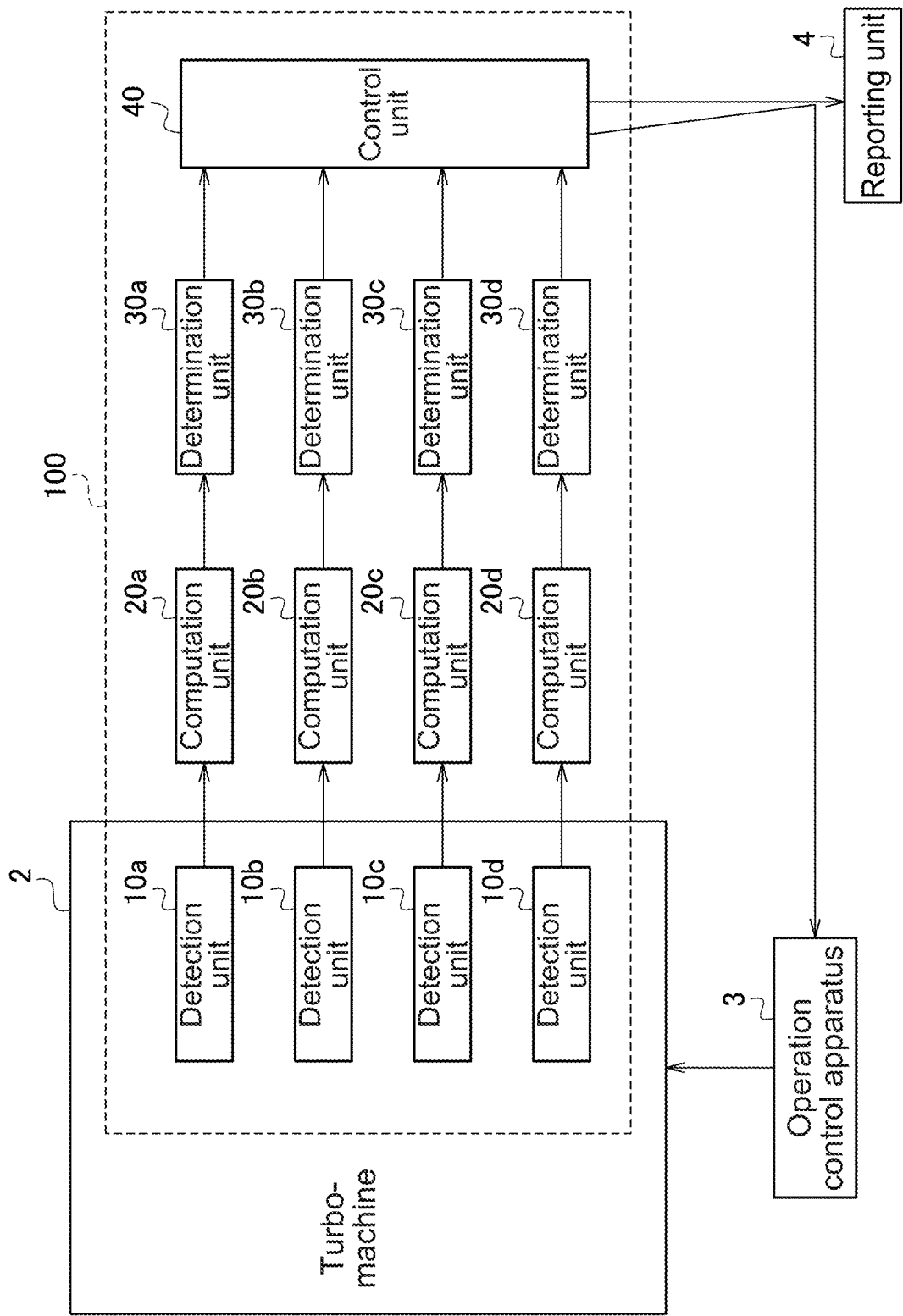
FIG. 23 A block diagram showing an observation apparatus according to still another embodiment of the present invention.

Moreover, as shown in FIG. 23, the observation apparatus 100 may include two or more types of detection units 10a to 10d, two or more types of computation units 20a to 20d, and two or more types of determination units 30a to 30d. Accordingly, it is possible to detect more kinds of unstable operations at the same time and enhance the reliability.

In addition, the kind of unstable operations that will occur can be determined by using two or more types of sensors, two or more types of computation units, and two or more types of determination units and mounting them at suitable circumferential or axial positions in the turbo-machine.

The computation unit(s), the determination unit(s), and the control unit(s) according to the present invention is executable by a computer. Those computation unit(s), determination unit(s), and control unit(s) may be considered as programs executable by a computer.

The present invention can be applied to gas turbine engines for aircraft or watercraft for enhancing the safety during the operation. Moreover, the present invention can be applied to gas turbines for power generation, steam turbines, or wind turbines for power generation for monitoring the operation stability during the operation and enhancing the reliability of the electric power supply.

REFERENCE SIGNS LIST 1 observation apparatus
2 turbo-machine
2a blade
2b wall surface
3 operation control apparatus
4 reporting unit
10 detection unit
11, 12 sensor
20 computation unit
30 determination unit
40 control unit
100 observation apparatus

The invention claimed is:

1. An observation apparatus, comprising:
   a detection unit including two or more sensors that are disposed in a turbo-machine, are highly time responsive, and observe unsteady fluctuations of the turbo-machine;
   a computation unit that output signals from the two or more sensors every moment, stores time series data for a predetermined period, and calculates in real time a parameter for detecting an unstable operation of the turbo-machine;
   a determination unit that determines a sign or occurrence of the unstable operation on a basis of the parameter for detecting the unstable operation; and
   a control unit that outputs, when the determination unit outputs a determination result of the sign or occurrence of the unstable operation, a signal for changing an operation condition for an operation control apparatus of the turbo-machine and/or a signal for warning of an operation of the turbo-machine,
   wherein the computation unit calculates the parameter for detecting the unstable operation by quantitatively evaluating randomness and a recurrence change on a basis of the time series data,
   wherein the detection unit includes two or more types of detection units, the computation unit includes two or more types of computation units, and the determination unit includes two or more types of determination units,
   wherein the two or more types of computation units calculate two or more types of parameters for detecting the unstable operation by quantitatively evaluating randomness and the recurrence change on the basis of the time series data, and
   wherein the two or more types of determination units determine the sign or occurrence of two or more types of the unstable operation at a same time.

2. The observation apparatus according to claim 1, wherein
   the two or more sensors are disposed on at least one of a rotating unit, a stationary unit, an inside of a flow channel, or a wall surface in contact with the flow channel in the turbo-machine.

3. The observation apparatus according to claim 1, wherein
   the computation unit calculates the parameter as a sample entropy that is an index for quantitatively evaluating the randomness of the time series data.

4. The observation apparatus according to claim 3, wherein
   provided that the time series data is expressed as $\{x(t_i)\}$, i=1, 2, ..., N, the time series data $\{x(t_i)\}$ is embedded in phase spaces of D and D+1 dimensions, and conditional probability that a point that was nearby in the D dimension is also nearby in the D+1 dimension is defined as a negative natural logarithm, and provided that the sample entropy is denoted by SE, the sample entropy SE is calculated by the following equation $$S_E = -\log \frac{\sum_{i=1, i\neq j}^{N-D} \Theta(r - d[X_{D+1}(i), X_{D+1}(j)])}{\sum_{i=1, i\neq j}^{N-D+1} \Theta(r - d[X_D(i), X_D(j)])}$$

where r denotes a predetermined threshold $$d[X_D(t_i), X_D(t_j)] = \max |x(t_{i+k}) - x(t_{j+k})|$$

$$X_D(t_i) = (x(t_i), x(t_{i+1}), x(t_{i+2}), \ldots, x(t_{i+D-1})).$$

5. The observation apparatus according to claim 1, wherein
the computation unit calculates the parameter as a sample entropy considering a multi-scale property that is an index for performing coarse graining on the time series data and quantitatively evaluating the randomness of the time series data after the coarse graining.

6. The observation apparatus according to claim 5, wherein
provided that the time series data is denoted by x(t$_i$), a time average of the time series data x(t$_i$) is determined by non-overlapping average using the following equation and time series data y(t$_j$) is obtained $$y(t_j) = \frac{1}{s_f} \sum_{i=(j-1)s_f+1}^{js_f} x(t_i)$$

where
x(t$_i$): Time series
s$_f$: Scaling factor
y(t$_j$): Coarse-grained time series, and
the sample entropy is calculated by using the time series data y(t$_j$).

7. The observation apparatus according to claim 1, wherein
the computation unit calculates the parameter as recurrence plots that are an index for embedding the time series data in a phase space and visualizing a correlation between respective points of the time series data in the phase space.

8. The observation apparatus according to claim 7, wherein
provided that the time series data is denoted by x(t$_i$), computation according to the following equation is performed with respect to the correlation between the respective points of the time series data in the phase space and a result of computation is plotted for obtaining the recurrence plots $$X(t_i) = (x(t_i), x(t_i+\tau), \ldots, x(t_i+(D-1)\tau))$$

$$R_{ij} = \Theta(\varepsilon - \|x(t_i) - x(t_j)\|) \; i,j = 1,2,3, \ldots, N_P$$

where
θ: Heaviside function
ε: threshold of distance between position vectors
N$_P$: total number of data points in phase space
D: dimension of phase space
τ: delay time.

9. The observation apparatus according to claim 8, wherein
provided that an index for determining the sign or occurrence of the unstable operation is denoted by DET, the determination unit calculates the index DET in the obtained recurrence plots in accordance with the following equation $$DET = \frac{\sum_{l=l_{min}}^{N_p} lP(l)}{\sum_{l=1}^{N_p} lP(l)}$$

where
l: length of diagonal line in recurrence plots
l$_{min}$: minimum length defined as diagonal line in recurrence plots
P(l): frequency distribution function of diagonal line having length l in recurrence plots.

10. The observation apparatus according to claim 1, wherein
the computation unit calculates the parameter as a permutation entropy that is an index for quantitatively evaluating the randomness of the time series data.

11. The observation apparatus according to claim 10, wherein
the time series data is classified into predetermined permutation patterns and the permutation entropy is calculated by applying existence probability of each of the permutation patterns to Shannon's information entropy.

12. The observation apparatus according to claim 11, wherein
the Shannon's information entropy is expressed by the following equation using a discrete probability distribution p of a random variable of an event $$s = -\sum_{i=1}^{N} p \log_2 p$$

where N=D!
D: dimension of phase space, and
provided that the permutation entropy is denoted by h$_p$, the permutation entropy h$_p$ is calculated in accordance with the following equation $$0 \leq h_p = \frac{-\sum_{i=1}^{D!} p(i) \log_2 p(i)}{\log_2 D!} \leq 1.$$

13. The observation apparatus according to claim 1, wherein
the determination unit compares the parameter for detecting the unstable operation with a predetermined threshold and outputs in real time the determination result of the sign or occurrence of the unstable operation.

14. An observation method, comprising:
disposing in a turbo-machine two or more detection units, each including two or more sensors that are highly time responsive to the turbo-machine and observe unsteady fluctuations of the turbo-machine;
inputting output signals from the two or more sensors of each detection unit every moment, storing time series data for a predetermined period, and calculating, by two or more computation units, in real time two or more parameters for detecting an unstable operation of the turbo-machine by quantitatively evaluating randomness and a recurrence change on a basis of the time series data; and determining, by two or more detection units, a sign or occurrence of two or more types of the unstable operation at a same time on a basis of the two or more parameters; and when a determination unit of the two or more determination units outputs a determination result of the sign or occurrence of the unstable operation, outputting, by a control unit, a signal for changing an operation condition for an operation control apparatus of the turbo-machine and/or a signal for warning of an operation of the turbo-machine.

15. A non-transitory computer readable medium storing a program that causes a computer to execute:

a step of inputting output signals from two or more sensors, of each detection unit of two or more detection units disposed in a turbo-machine, storing time series data for a predetermined period, and calculating, by two or more computation units, in real time two or more parameters for detecting an unstable operation of the turbo-machine by quantitatively evaluating randomness and a recurrence change on a basis of the time series data, each sensor being highly time responsive to the turbo-machine and being configured to observe unsteady fluctuations of the turbo-machine;

a step of determining, by two or more detection units, a sign or occurrence of two or more types of the unstable operation at a same time on a basis of the two or more parameters; and when a determination unit of the two or more determination units outputs a determination result of the sign or occurrence of the unstable operation, outputting, by a control unit, a signal for changing an operation condition for an operation control apparatus of the turbo-machine and/or a signal for warning of an operation of the turbo-machine.

\* \* \* \* \*